US012733771B2

(12) United States Patent
Sewall et al.

(10) Patent No.: US 12,733,771 B2
(45) Date of Patent: Sep. 15, 2026

(54) PATIO WARMER FOR HINGED, COVERED GRILL

(71) Applicant: Linwood Resources, LLC, St. Paul, MN (US)

(72) Inventors: David O. Sewall, St. Paul, MN (US); David R. Cleveland, Big Sky, MT (US)

(73) Assignee: Linwood Resources, LLC, St. Paul, MN (US)

( * ) Notice: Subject to any disclaimer, the term of this patent is extended or adjusted under 35 U.S.C. 154(b) by 17 days.

(21) Appl. No.: 18/237,207

(22) Filed: Aug. 23, 2023

(65) Prior Publication Data

US 2023/0397764 A1 Dec. 14, 2023

Related U.S. Application Data

(63) Continuation of application No. PCT/US2022/019004, filed on Mar. 4, 2022.
(Continued)

(51) Int. Cl.
*A47J 37/07* (2006.01)
*F24B 1/26* (2006.01)
*F24B 1/20* (2006.01)

(52) U.S. Cl.
CPC ....... *A47J 37/0786* (2013.01); *A47J 37/0704* (2013.01); *F24B 1/26* (2013.01)

(58) Field of Classification Search
CPC ...... A47J 37/0786; A47J 37/0704; F24B 1/26
See application file for complete search history.

(56) References Cited

U.S. PATENT DOCUMENTS 239,873 A * 4/1881 Southward ............ F24B 1/1957 126/553
1,318,216 A * 10/1919 McElveen ............. F24B 1/1957 126/553
(Continued)

FOREIGN PATENT DOCUMENTS

DE 102013010377 A1 6/2014
FR 23732 E * 12/1921
(Continued)

OTHER PUBLICATIONS

Webpage, https://www.amazon.com/gp/product/B08K4CB2Q9/ref=pe_3676590_565761920_em_1p_0_lm?pldnSite=1, Smokitcen Adjustable Heat Focusing Reflector for Round Natural Gas and Propane Patio Heaters, Jan. 2021, 10 pages.
(Continued)

*Primary Examiner* — Michael G Hoang
*Assistant Examiner* — Logan P Jones
(74) *Attorney, Agent, or Firm* — Husch Blackwell LLP

(57) ABSTRACT

A patio or other outdoor dining space can be warmed using an outdoor warming adapter device temporarily installed in a partially opened hinged covered grill having a base and cover joined by the hinge, a cover handle and grill front opposite the hinge, and a gasketed cover periphery that defines a cover opening area. The adapter device includes a cover supporting portion that holds the cover and base apart in a partially opened position when the adapter device is inserted between the cover and base and the cover is rotated towards the base, and a cover obstructing portion that shields the majority of the cover gasket and cover opening area from combustion heat rising from a heat source in the base and reflects such combustion heat in a generally horizontal direction away from the hinge and towards the grill front.

28 Claims, 8 Drawing Sheets

Related U.S. Application Data

(60) Provisional application No. 63/157,381, filed on Mar. 5, 2021.

(56) References Cited

U.S. PATENT DOCUMENTS 2,083,145 A * 6/1937 Campbell ............... F24C 15/18 126/6
2,088,280 A * 7/1937 Schillinger ............ F24C 15/18 126/90 R
2,553,278 A * 5/1951 Rogant .................. F24C 15/18 126/110 B
2,646,787 A * 7/1953 Suttles .................. F24C 15/18 126/19 M
3,021,830 A * 2/1962 Witcher ............. A47J 37/0786 126/25 C
3,227,149 A * 1/1966 Clark ..................... A47J 37/06 126/92 R
3,276,440 A 10/1966 Sazegar
3,280,813 A 10/1966 Schaenzer
3,320,942 A * 5/1967 Christensen ........ A47J 37/0704 126/25 C
3,395,691 A * 8/1968 Skarsten ............ A47J 37/0763 126/25 R
3,513,822 A * 5/1970 Otto ................... A47J 37/0713 126/41 R
3,809,058 A 5/1974 Becker
3,935,809 A * 2/1976 Bauer ................ A47J 37/0713 99/450
4,452,225 A 6/1984 Plant
5,829,426 A * 11/1998 Cloutier ............. A47J 37/0704 126/41 R
6,705,306 B1 * 3/2004 Dickey ............... A47J 37/0786 248/354.4
6,913,011 B1 7/2005 Snider
7,111,623 B2 9/2006 Brennan
8,047,197 B1 * 11/2011 Zernich .................. F24C 15/22 126/92 AC
9,038,620 B2 5/2015 Brown
9,155,416 B1 10/2015 Kuhl
9,351,607 B2 5/2016 Pothetes
10,085,594 B1 * 10/2018 Britvan .............. A47J 37/0786
2004/0094141 A1 * 5/2004 Herring .................. A47J 36/12 126/211
2005/0121018 A1 6/2005 Rosen
2006/0042475 A1 3/2006 Craig
2008/0163863 A1 * 7/2008 Thomas ................. F24C 3/022 126/512
2008/0277541 A1 11/2008 Stephens
2009/0308373 A1 12/2009 Scott et al.
2010/0095946 A1 4/2010 Creel
2010/0258105 A1 10/2010 Simms, II
2010/0258106 A1 * 10/2010 Simms, II ........... A47J 37/0763 126/25 R
2014/0014086 A1 * 1/2014 Case .................. A47J 37/0786 126/19 R
2014/0224241 A1 8/2014 McCary
2015/0323190 A1 11/2015 Stein
2017/0102151 A1 * 4/2017 Mushnick ............... F24C 15/22
2017/0261385 A1 * 9/2017 Kohli ....................... G01K 1/14
2018/0156466 A1 * 6/2018 Spalding ............... F24B 1/1957
2018/0263415 A1 9/2018 Hackley
2019/0254478 A1 * 8/2019 Ries .................... A47J 37/0786
2019/0335948 A1 * 11/2019 Reales Bertomeo ........................ A47J 37/0713
2020/0245811 A1 8/2020 Pruitt et al.
2021/0063018 A1 * 3/2021 Widelitz ................. F24C 15/28
2021/0102706 A1 4/2021 Offerhaus
2022/0087474 A1 * 3/2022 Carter ................ A47J 37/0754
2022/0146116 A1 * 5/2022 Derian-Toth .............. F24C 3/14
2022/0265089 A1 * 8/2022 Copland ............. A47J 37/0786

FOREIGN PATENT DOCUMENTS

GB 155426 A * 12/1920
GB 2417672 A 3/2006
GB 2437913 A * 11/2007 ............ A47J 37/074
GB 2527560 A * 12/2015 .......... A47J 37/0704
RU 173882 U1 9/2017
TR 202004425 U5 * 5/2020
WO WO 2001/27536 A1 4/2001

OTHER PUBLICATIONS

PCT/US2022/019004, International Search Report and Written Opinion dated Jun. 2, 2022, 10 pages.

* cited by examiner

PATIO WARMER FOR HINGED, COVERED GRILL

CROSS REFERENCE TO RELATED APPLICATIONS

The present application is a continuation under 35 U.S.C. § 111(a) of International Patent Application No. PCT/US2022/019004 filed on Mar. 4, 2022 and entitled "Patio Warmer for Hinged, Covered Grill,", which claims priority to U.S. Provisional Application No. 63/157,381 filed on Mar. 5, 2021 and entitled "Patio Warmer for Hinged, Covered Grill," the disclosures of each of which are hereby incorporated by reference in their entirety.

FIELD

This invention relates to barbeque grills.

BACKGROUND

Outdoor barbecue grills are available in a variety of styles. Many outdoor cooks prefer covered ceramic (viz., kamado) grills, which typically burn lump charcoal, charcoal briquettes or bonded wood pellets. Although kamado grills have been used for many centuries, nowadays kamado grills are typically made from modern-day ceramic materials, are generally egg-shaped with a base and cover joined by a hinge, and are commercially available in several sizes from manufacturers including Kamado Joe of Columbus, Georgia and Big Green Egg, Inc. of Atlanta, Georgia.

Burning charcoal, and especially lump charcoal, in such grills provides a long-lasting, steady heat source with minimal maintenance and ash residue. During a cook, the grill cover typically is kept closed and a movable air vent in the base and moveable smoke vent in the cover are adjusted to obtain a desired temperature. At the conclusion of the cook, the cover is raised to permit removal of the cooked food, following which the cover is lowered and the vents closed in order to extinguish the heat source.

Food cooked outdoors is often also eaten outdoors, for example on decks or patios which may also house or lie adjacent to the grill and one or more tables, chairs or stools. Outdoor dining is however subject to weather conditions, and umbrellas, gas-operated patio heaters or fireplaces may be needed to provide more comfortable dining conditions. Diners often desire to linger following the meal, but may be compelled to go indoors once the dining area becomes uncomfortably cool, for example after the sun has set and temperatures have dropped.

SUMMARY OF THE INVENTION

The present invention provides, in one aspect, an outdoor warming adapter device for use in a partially opened hinged covered grill having a base and cover joined by the hinge, a cover handle and grill front opposite the hinge, and a gasketed cover periphery that defines a cover opening area, and wherein the adapter device includes:

a) a cover supporting portion that holds the cover and base apart in a partially opened position when the adapter device is inserted between the cover and base and the cover is rotated towards the base, and b) a cover obstructing portion that shields the majority of the cover gasket and cover opening area from combustion heat rising from a heat source in the base and reflects such combustion heat in a generally horizontal direction away from the hinge and towards the grill front.

The present invention provides, in another aspect, a hinged, covered grill having a base and cover joined by the hinge, a cover handle and grill front opposite the hinge, and a gasketed cover periphery that defines a cover opening area, and further comprising an outdoor warming adapter device inserted between the cover and base, wherein the adapter device includes:

a) a cover supporting portion that holds the cover and base apart in a partially opened position when the adapter is so inserted and the cover is rotated towards the base, and b) a cover obstructing portion that shields the majority of the cover gasket and cover opening area from combustion heat rising from a heat source in the base and reflects such combustion heat in a generally horizontal direction away from the hinge and towards the grill front.

The present invention provides, in yet another aspect, a method for outdoor warming, comprising in either order the steps of a) building a fire from combustible material in the base of a hinged, covered grill having a base and cover joined by the hinge, a cover handle and grill front opposite the hinge, and a gasketed cover periphery that defines a cover opening area, and b) opening the cover, installing in the grill an outdoor warming adapter device, and partially closing the cover to trap the adapter device between the cover and base with the cover in a partially opened position, wherein the adapter device includes:

a) a cover supporting portion that holds the cover and base apart in a partially opened position when the adapter is inserted between the cover and base and the cover is rotated towards the base, and b) a cover obstructing portion that shields the majority of the cover gasket and cover opening area from combustion heat rising from a heat source in the base and reflects such combustion heat in a generally horizontal direction away from the hinge and towards the grill front.

The disclosed adapter devices, grills and method enable outdoor warming using a hinged, covered grill without having to employ a separate outdoor fireplace or patio warmer device and without having to build or ignite a separate fire. The adapter device may be sold together with a new grill or as an aftermarket accessory for an existing grill. The device has particular utility when used with ceramic hinged, covered kamado-style grills or when used with other hinged covered grills such as metal insulated charcoal-burning grills shaped to resemble covered ceramic grills.

BRIEF DESCRIPTION OF THE DRAWING

Like reference symbols in the various figures of the drawing indicate like elements. The elements in the drawing are not to scale.

DETAILED DESCRIPTION

Figure 1:
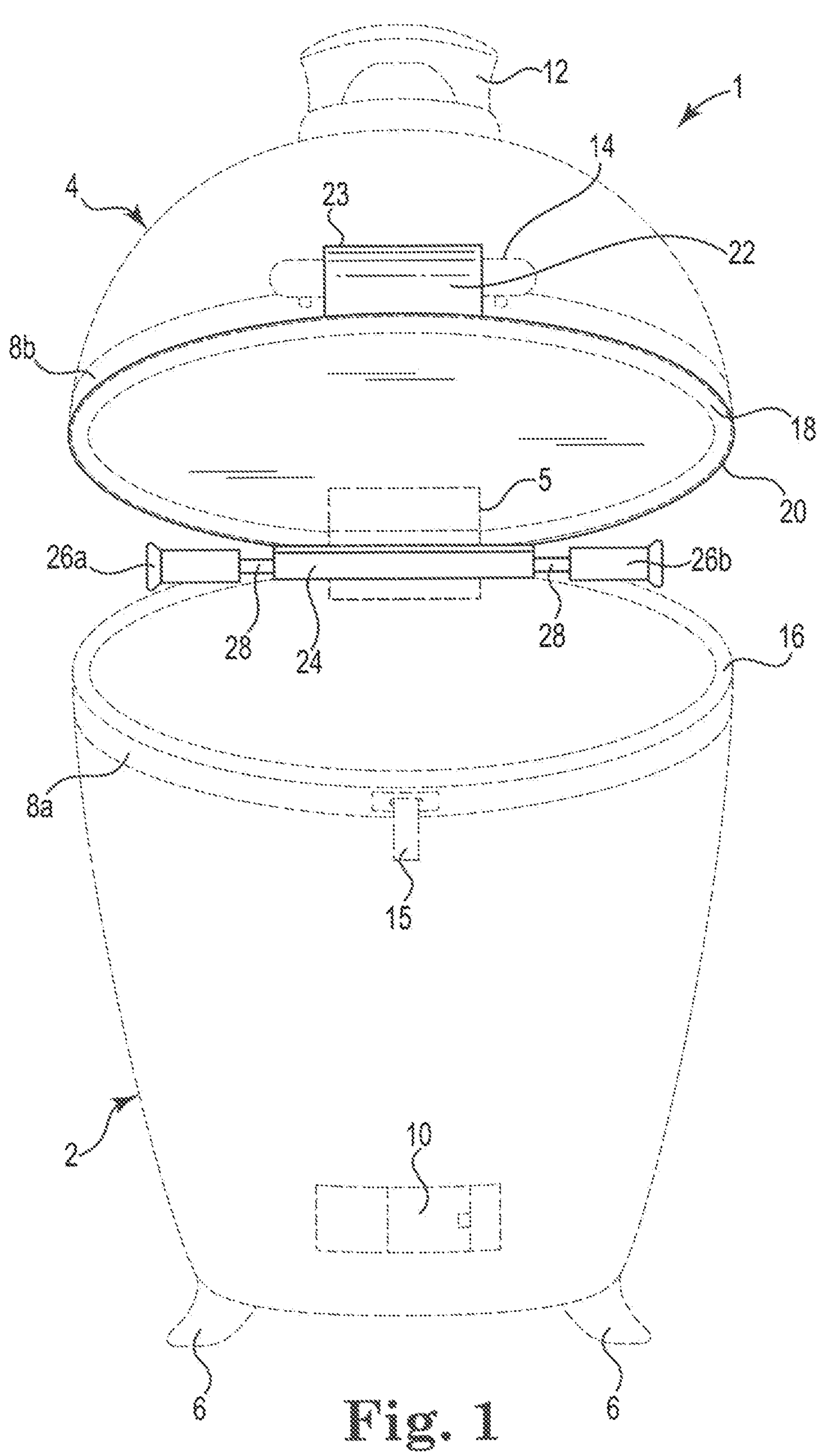
FIG. 1 is a perspective view, partially in phantom, of an embodiment of the disclosed adapter device installed in a hinged, covered grill in a partially opened position.

The recitation of a numerical range using endpoints includes all numbers subsumed within that range (e.g., 1 to 5 includes 1, 1.5, 2, 2.75, 3, 3.80, 4, 5, etc.).

The terms "a," "an," "the," "at least one," and "one or more" are used interchangeably. Thus, for example, an adapter that includes "a" handle means that the adapter includes "one or more" handles.

The term "aperture" means a hole, slot or other opening.

The term "backside" when used in reference to the disclosed adapter or its cover obstructing portion refers to the major surface of the cover obstructing portion that will face the cover interior when the disclosed adapter is installed in a hinged, covered grill.

The term "detachably fastens the adapter to the cover", when used in reference to the disclosed adapter device, means a mechanical (including magnetic or electromagnetic) linkage between a grill cover attaching portion of the adapter and a portion of the cover or component thereof (e.g., the cover handle, cover attachment band, or other component that travels with the cover when it is raised). Such linkage may be fixed and without play, or may be loose and permit a degree of play between the adapter and cover or component thereof when the cover is raised.

The term "disc" when used in reference to the disclosed cover obstructing portion means a heat-resistant substantially planar or curved sheetlike object having a generally continuous or nearly continuous rounded or at least partially rounded periphery and major backside and fire side surfaces. Suitable such peripheries include circular shapes like those in the mating halves of a Kamado Joe or Big Green Egg ceramic grill or a Summit Charcoal grill (from Weber-Stephen Products), oval shapes like those in the mating halves of a Primo grill (from Primo Grills and Smokers of Tucker, Ga), flattened teardrop shapes like those in the mating halves of a Komodo Kamado OTB grill (from Komodo Kamado of Bali, Indonesia), and other functionally similar shapes.

The term "fire side" when used in reference to the disclosed adapter or its cover obstructing portion refers to the major surfaces of the cover obstructing portion that will face a cook standing in front of the grill when the disclosed adapter is installed in a hinged, covered grill.

The term "grill" means a cooking device capable of a variety of cooking tasks including but not limited to grilling, baking, smoking and roasting.

The terms "half" and "halves" when used in reference to a hinged, covered grill are approximate, and need not represent a geometric one-half of the total shell surface in a covered grill. An individual half normally will be a lower surrounding shell that holds charcoal or other heat source, or an upper surrounding shell that serves as a cover.

The term "joinder seam" when used in reference to a hinged, covered grill refers to the parting plane or parting line defined by the mating sealing surfaces of the grill base and cover when the cover is fully closed and its cover sealing surface is in full normal contact with the base sealing surface.

The terms "partially opened" and "partially closed" when used in reference to a hinged, covered grill, mean that the grill cover has been rotated away from the grill base through a portion of but not through all of its hinged travel arc, so that the cover and base no longer contact one another through the full extent of their normal sealing surfaces. In such a position part or all of the cover sealing surface, and in some embodiments at least a portion of the base sealing surface, may however contact the installed adapter device. The terms "partially opened" and "partially closed" thus may refer to a hinged, covered grill either before or after installation of the disclosed adapter device between the grill cover and grill base. These terms will be used whether or not other grill openings (such as the air intake vent normally provided in a grill base, or the combustion product exhaust vent normally provided in a grill cover) are fully or partially open or closed.

Turning now to FIG. 1, hinged, covered ceramic grill 1 is shown in phantom. Grill 1 is generally egg-shaped and includes lower approximate half or base 2, upper approximate half or cover 4, hinge 5 and feet 6. As will be understood by those skilled in the ceramic grill art, grill 1 may be supported in a variety of other devices including wheeled or stationary nests, tripods and supporting tables (not shown in FIG. 1). Hinge 5 is affixed to clamping bands 8*a* and 8*b* which respectively surround base 2 and cover 4. Ash door and air intake 10 in base 2 and smoke vent 12 atop cover 4 are adjustable to regulate the intake of combustion air and the exhaust of smoke and other combustion products. Cover handle 14 attached to band 8*b* permits cover 4 to be raised by rotating cover 4 away from base 2 in an arc around (viz., through the arc of travel of) hinge 5. In some grills (for example, the above-mentioned Kamado Joe grills), hinge 5 is spring-assisted with sufficient spring force to enable cover 4 to remain in place when partially opened to less than a full open position, for example when opened to a 45° angle with respect to the closed position. In other grills, hinge 5 may be an unassisted, partially spring-assisted, or movable axis design in which cover 4 will remain in place when fully opened but may not remain in place when opened to 45° or other less than angle. Base 2 and cover 4 respectively have gaskets 16 and 18 that contact one another at a joinder seam when cover 4 is fully closed onto base 2. The periphery of cover gasket 18 defines a cover opening area in the underside of cover 4.

As shown in FIG. 1, adapter device 20 is a disc-shaped device with a generally circular periphery and a shape and diameter like that fully shields cover gasket 18 and the periphery of cover 4 from combustion heat that will arise from base 2 when grill 1 is fired up. Adapter 20 has been temporarily attached to cover 4 by opening cover 4 to a greater extent than depicted in FIG. 1, hooking optional cover attaching portion 22 over cover handle 14, swinging adapter 20 toward hinge 5 so that cover supporting portion 24 lies near hinge 5 between the nearby portions of base 2 and cover 4, and partially closing cover 4 until cover 4 is prevented from further closure when cover supporting portion 24 becomes pinched between gaskets 16 and 18 (or between portions of the cover sealing surface and the base sealing surface adjacent to gaskets 16 and 18) on base 2 and cover 4. When cover 4 is partially closed as described, and as depicted generally in FIG. 1, adapter 20 will cover gasket 18, will protect gasket 18 from grilling heat, and as described in more detail below will reflect, in a generally horizontal direction away from hinge 5, combustion heat rising from a heat source in base 2. The thus-reflected heat can warm a cook and diners standing, seated or otherwise situated in front of partially-opened grill 1. When such warming heat is no longer needed or when the heat source embers have died down, adapter 20 may easily be removed from grill 1 by raising cover 4 sufficiently so that adapter 20 can be withdrawn from grill 1 (and if optional cover attachment portion 22 has been employed, can be swung toward the front of grill 1 or otherwise repositioned so that adapter 20 can be unhooked from cover handle 14) and removed for storage as needed. Typically cover 4 will then be closed to extinguish the remaining embers, if any, and to allow grill 1 to cool to ambient temperature.

Handles 26*a* and 26*b* may be located on supporting rod 28 passing through cover supporting portion 24, and can facilitate carrying, installing and removing adapter 20. Typically, a user would grip adapter 20 by grabbing the hooked end 23 of cover attaching portion 22 with one hand, and by using the other hand to grasp whichever of handles 26*a* or 26*b* is most accessible. Hooked end 23 and handles 26*a* or 26*b* desirably may be used for such purposes even when adapter 20 is hot, due to the general positioning of hooked end 23 and handles 26*a* and 26*b* outside grill 1 and away from heat that may arise from combustible materials in base 2. If desired, the potential for overheating and the ergonomics of hooked end 23 and handles 26*a* and 26*b* may be improved in a variety of ways. For example, hooked end 23 may be covered with a cap (not shown in FIG. 1) made of plastic, wood or other heat-insulating material to discourage the transmission of heat from adapter 20 into such cap. If desired, a separate handle (also not shown in FIG. 1) made of plastic, wood or other heat-insulating material may be added to optional cover attaching portion 22 and oriented so that such separate handle will not be directly exposed to heat that may spill past the top of adapter 20. If desired, supporting rod 28 may be bent or handles 26*a* and 26*b* may be reshaped so that the grip areas of handles 26*a* and 26*b* are angled rearwards with respect to cover supporting portion 24 and base 2.

Figure 2:
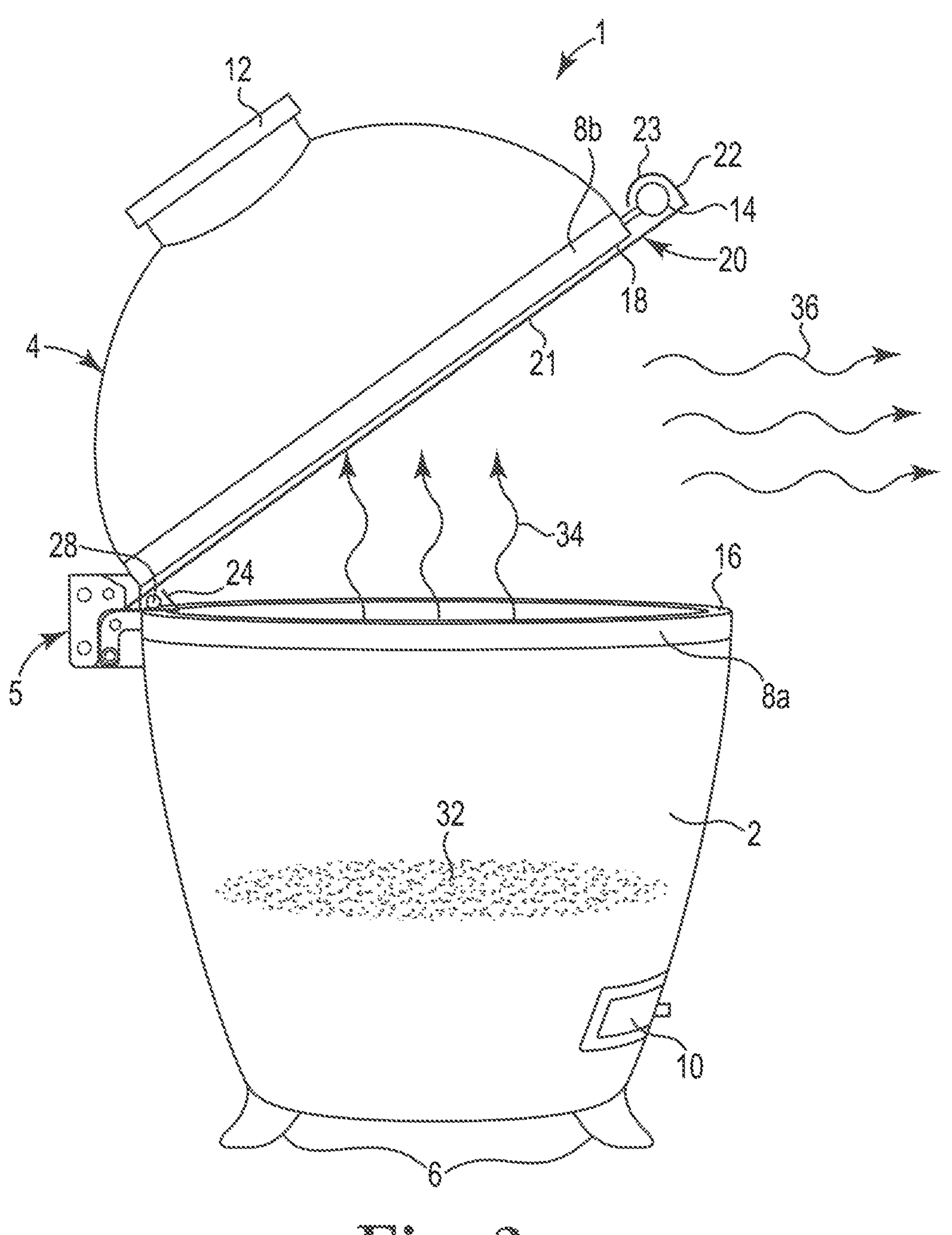
FIG. 2 is a side view of the FIG. 1 adapter device and grill.

FIG. 2 illustrates ceramic grill 1 and installed adapter device 20 in a side view. Burning lump charcoal 32 (shown in phantom) produces rising heat (depicted by arrows 34) which strikes the inclined fire side and grill front-facing surface 21 of adapter 20 and thereafter reflected (as depicted by arrows 36) in a generally horizontal direction away from hinge 5 and toward the front of grill 1. This reflected heat (which in the absence of adapter 20 would pass through smoke vent 12 or curl around cover 4 and then rise skyward), instead radiates into the outdoor area in front of grill 1, thereby warming and improving the comfort of the chef and other seated or standing nearby diners or guests.

Figure 3:
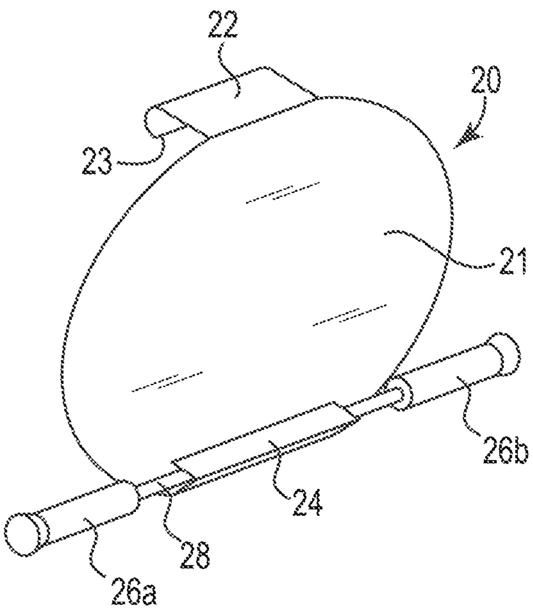
FIG. 3 is a perspective view of an embodiment of the disclosed adapter device.
Figures 6A, 6B, 6C:
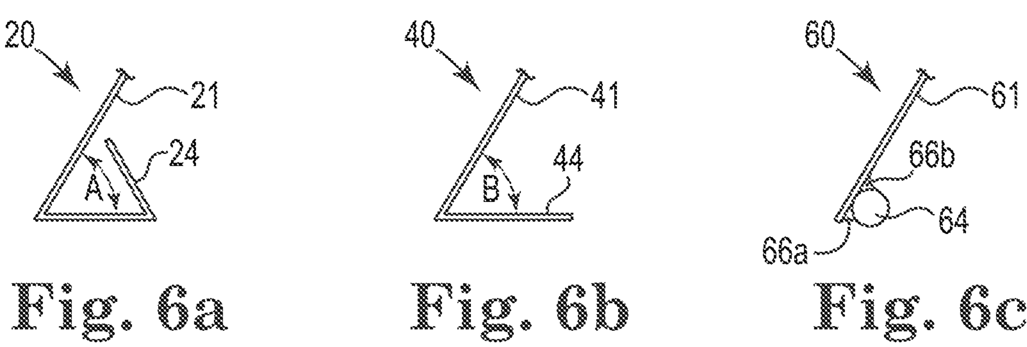
FIGS. 6*a* through 6*c* are side views of three embodiments of the disclosed cover supporting portion.

For clarity and so that the shape of some embodiments of cover supporting portion 24 may be seen more clearly, handles 26*a* and 26*b* are not included in FIG. 2. Handles 26*a* and 26*b* are included in FIG. 3, which is a perspective view of adapter 20. The embodiments of optional cover attaching portion 22 and cover supporting portion 24 depicted in FIG. 2 and FIG. 3 may easily be shaped by cutting adapter 20 from a flat metal sheet using materials discussed in more detail below, and folding and forming cover attaching portion 22 and cover supporting portion 24 using a suitable sheet metal bending brake or other metal-forming techniques that will be familiar to persons having ordinary skill in the art. As depicted in FIG. 2 and FIG. 3, optional cover attaching portion 22 is bent at approximately a right angle to face 21 (although other angles may be used), with hooked end 23 being shaped to wrap sufficiently around handle 14 so that the upper end of adapter 20 will remain in place when adapter 20 is installed. As also depicted in FIG. 2, and as shown in FIG. 6*a* discussed in more detail below, cover supporting portion 24 has a generally triangular cross-sectional shape and an acute angle proximate hinge 5 so as to aim the fire side 21 of adapter 20 (viz., the front face of adapter 20 as installed) to reflect combustion heat rising from base 2 in a suitable frontal direction. As shown in FIG. 2, cover supporting portion 24 has an open triangular cross-section with a small gap proximate the fire side 21 of adapter 20. If desired, cover supporting portion 24 may instead be formed with a closed triangular cross-section that contacts the fire side 21 of adapter 20. For added rigidity, such a closed triangular embodiment may if desired be reinforced using welds, rivets, bolts or other fastening systems. In addition, and although not depicted in the FIG. 2 embodiment, adapter 20 may be equipped with an angular adjustment feature by adding a suitable hinge and any of a variety of suitable adjustment mechanisms to cover supporting portion 24, or by adding appropriate shims, spacers or other components to adapter 20 (e.g., above or below cover supporting portion 24), to permit changing the resting angle of cover 4 when adapter 20 is installed on grill 1.

Although as discussed above various configurations for the hinge in a covered, hinged grill may be employed, hinge 5 as depicted in FIG. 2 is a movable pivot hinge whose effective pivot point moves laterally away from and downwardly with respect to base 2 as cover 4 moves upward. This lateral and downward movement (and in some grills, the action of one or more springs not shown in FIG. 2) helps raise and balance cover 4 as it approaches a fully opened position. If present, this lateral and downward movement should be taken into account when designing the disclosed adapter, for example to avoid unintended potential damage to the gaskets 16 and 18 when cover 4 is closed onto the adapter.

Figure 4:
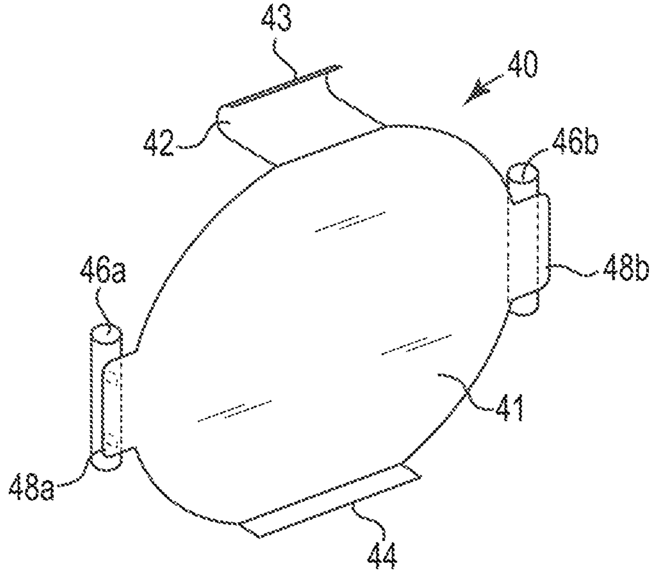
FIG. 4 is a perspective view of another embodiment of the disclosed adapter device.

Another embodiment 40 of the disclosed adapter device is shown in FIG. 4. Adapter 40 includes an optional cover attaching portion 42 whose hooked end 43 faces away from rather than towards the grill cover when adapter 40 is installed on a grill. Cover supporting portion 44 (also shown in FIG. 6*b* discussed in more detail below), may be formed by making a single bend at the bottom of adapter 40 to provide an acute angle between fire side 41 and cover supporting portion 44. Adapter 40 also includes handles 46*a* and 46*b* respectively fastened to the backsides of projecting wing portions 48*a* and 48*b*. Wing portions 48*a* and 48*b* are shaped to lie outside the grill cover when adapter 40 is installed in a grill, and help to shield handles 46*a* and 46*b* from combustion heat rising from the grill base. Handles 46*a* and 46*b* may be made from heat-resistant materials like those discussed above, and may be used in place of or in addition to handles 26*a* and 26*b* to assist in installing and removing adapter 40 in a grill.

Figure 5:
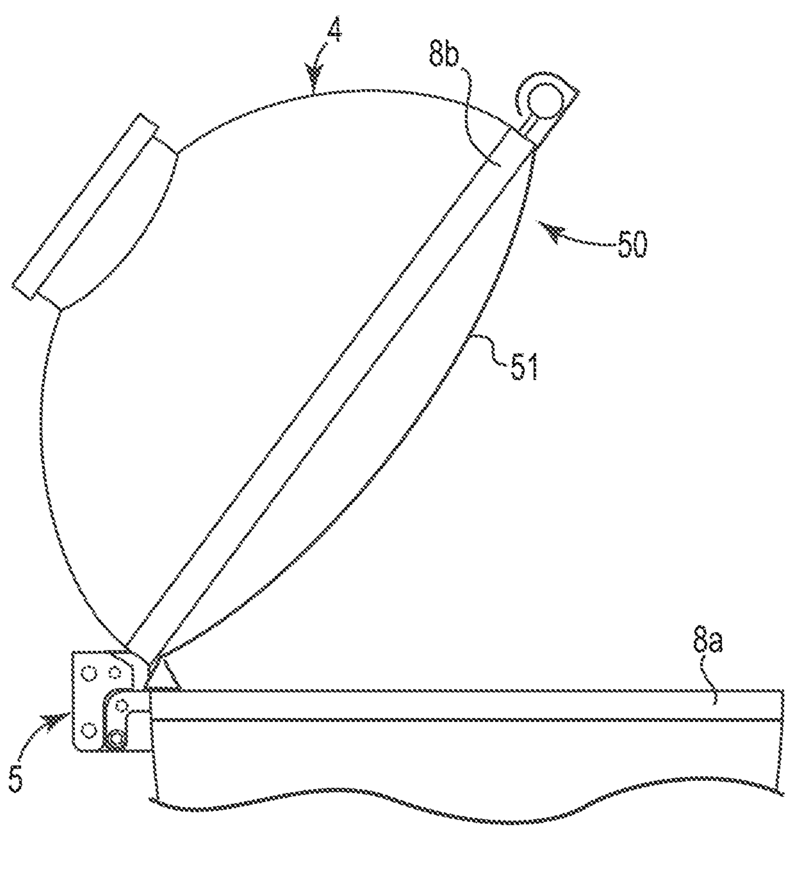
FIG. 5 is a side view of another embodiment of the disclosed adapter device installed in a hinged, covered grill in a partially opened position.

FIG. 5 shows a side view of an adapter device 50 installed on a grill cover 4 like that depicted in FIG. 1 and FIG. 2. Adapter 50 has a nonplanar cover obstructing portion whose fire side major surface 51 curves outwards from covers on which the adapter device is installed. Such curvature presents convexity with respect to heat rising from base 2 and can help reflect such heat across a broadened angular range and over a larger frontal area in comparison to the planar adapters shown in FIG. 1 through FIG. 4. Fire side 51 may have a variety of curvatures, including shapes that are generally curved on one or in more than one dimension. For example, fire side 51 may represent a section of a cylinder that will reflect rising heat over a broadened range of vertical angles, or a domed shape that will reflect rising heat over a broadened range of both vertical and horizontal angles). In other embodiments, the disclosed adapter may have other curvatures or other shapes, including shapes that are a section of a cylinder that will reflect rising heat over a broadened range of horizontal angles in comparison to the planar adapters shown in FIG. 1 through FIG. 4; shapes that are concave with respect to heat rising from base 2 so as to focus the reflected heat over a smaller area in comparison to the planar adapters shown in FIG. 1 through FIG. 4; shapes that have compound, irregular, circularly symmetric or circularly asymmetric configurations, and shapes that have facets (e.g., planar facets) that collectively may approximate a curved surface.

FIG. 6A through FIG. 6C show side views of three exemplary configurations for the cover supporting portion. A variety of other configurations may be used, but the three shown are illustrative and easy to fabricate. Cover supporting portion 24 in FIG. 6A is discussed above in connection with adapter 20 in FIG. 1 through FIG. 3. Supporting portion 24 has a triangular cross-sectional shape whose vertex angle A will control the resting position of a grill cover with respect to a grill base when adapter 20 is installed in a grill. Cover supporting portion 44 in FIG. 6B is discussed above in connection with adapter 40 in FIG. 4. Fire side 41 and supporting portion 44 form an acute angle B that will control the resting position of a grill cover with respect to a grill base when adapter 40 is installed in a grill. Cover supporting portion 64 in FIG. 6C is a simple round form and may be for example a hollow cylinder, solid rod or similar shape fastened to fire side 61 using any convenient form of attachment such as welding fillets 66*a* and 66*b*. The diameter and location of supporting portion 64 with respect to fire side 61 will control the resting position of a grill cover with respect to a grill base when adapter 60 is installed in a grill.

Figure 7A:
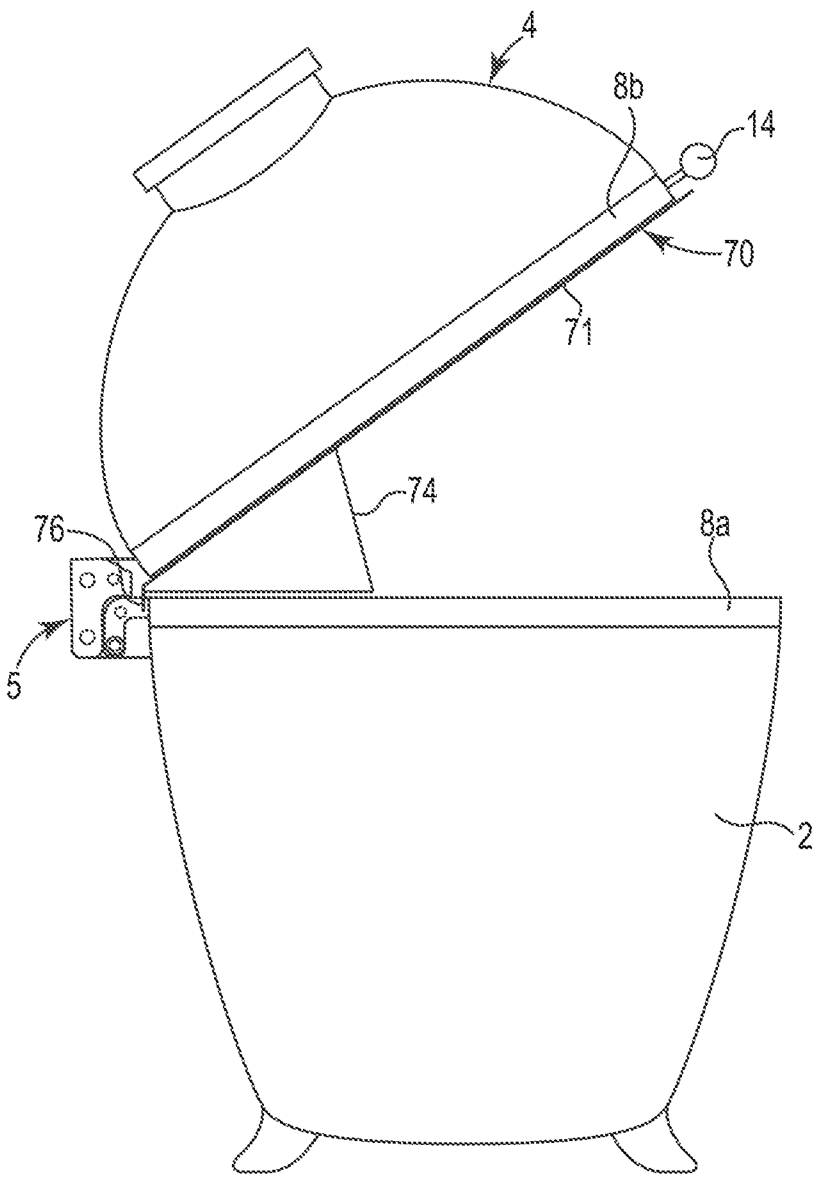
FIG. 7*a* is a side view and FIG. 7*b* is a perspective view of another embodiment of the disclosed adapter device.
Figure 7B:
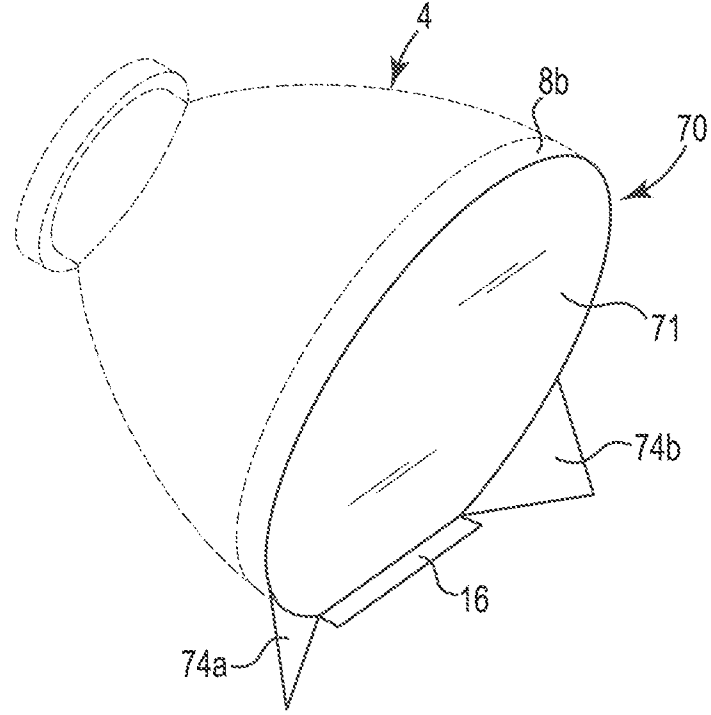

FIG. 7*a* shows in side view and FIG. 7*b* shows in perspective view an adapter 70 that does not include the above-mentioned optional cover attaching portion. Adapter 70 includes a cover obstructing portion 71, a cover supporting portion (74, 74*a* and 74*b*) and a hook 76 that extends rearwardly and downwardly from adapter 70 so as to lie outside base 2 when positioned proximate hinge 5. Hook 76 prevents adapter 70 from being dislodged towards the front of grill 1 when cover 4 is closed. The weight of cover 4 (as optionally partially counteracted by springs in hinge 5, not shown in FIG. 7*a*) helps keep adapter 70 and hook 76 in position and without requiring a separate cover attaching portion or the attachment thereof to cover 4.

Figure 8:
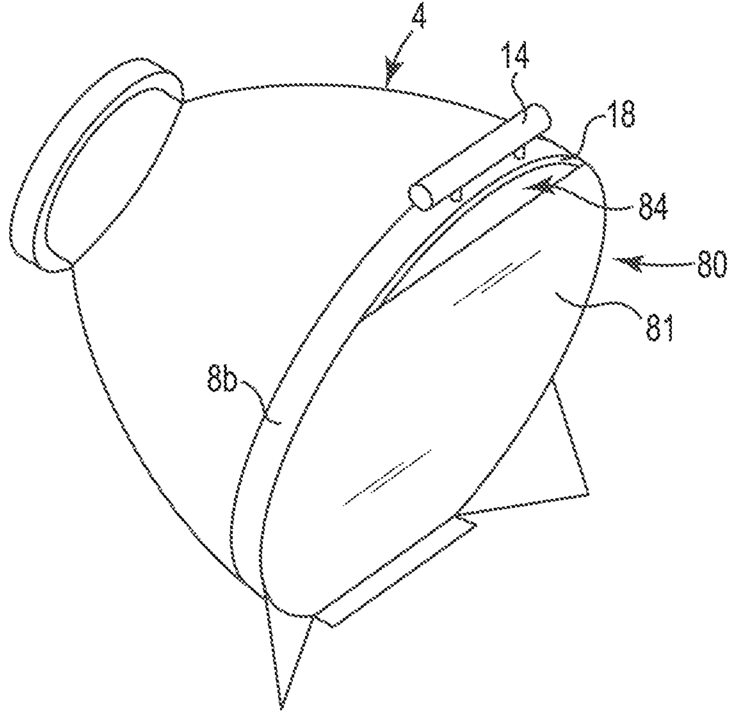
FIG. 8 and FIG. 9 are perspective views of additional embodiments of the disclosed adapter device.

FIG. 8 shows an adapter device 80 generally like adapter device 70 in FIG. 7*a* and FIG. 7*b*, but whose cover obstructing portion 81 does not fully shield gasket 18 and the cover opening in cover 4. The upper edge of cover obstructing portion 81 instead stops short of the periphery of cover 4, leaving a roughly D-shaped aperture 84 through which smoke can escape into cover 4. Inclusion of such an aperture can divert smoke that might otherwise curl around the front of cover 4 and cause smoke stains and other discoloration near handle 14.

Figure 9:
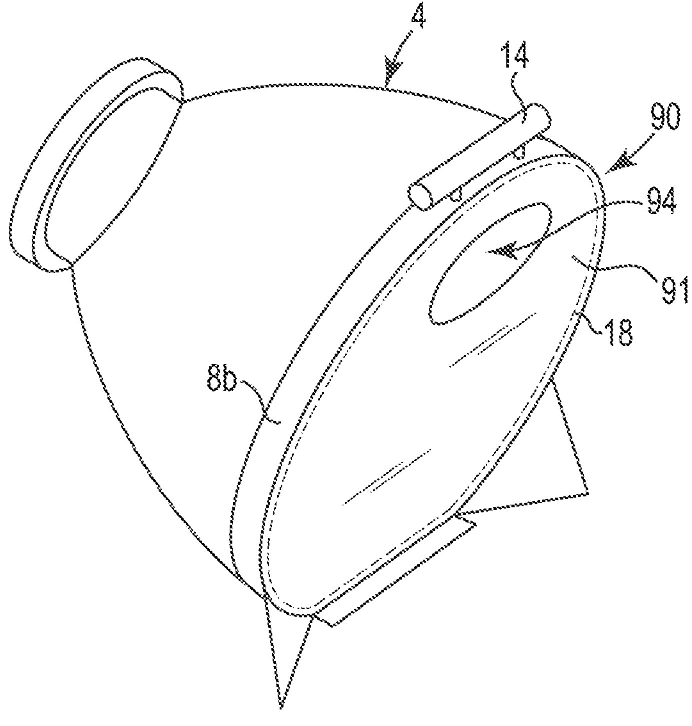

FIG. 9 shows an adapter device 90 generally like adapter device 80 in FIG. 8, but whose cover obstructing portion 91 fully shields gasket 18 and does not fully shield the cover opening in cover 4. The periphery of cover obstructing portion 91 covers all of gasket 18, and a generally oval-shaped aperture 94 located inboard of such periphery enables smoke to escape into cover 4. Aperture 94 may if desired be replaced by a plurality of spaced apertures, e.g., perforations created using a punch, drill or other hole creation tool. Inclusion of such aperture(s) can divert smoke that might otherwise curl around the front of cover 4 and cause smoke stains and other discoloration near handle 14.

As noted above, the disclosed cover obstructing portion shields the majority of the cover gasket and cover opening area from rising combustion heat. The extent of such shielding may vary widely, and may for example be at least 50%, at least 60%, at least 70%, at least 80%, at least 90% or 100% of the cover gasket, and may likewise be at least 50%, at least 60%, at least 70%, at least 80%, at least 90% or 100% of the cover opening area. The unshielded area may be made adjustable, for example by providing a suitable movable shutter in the cover obstructing portion. For an adapter installed in a partially opened grill, flames and high heat are likely to be more intense near the hinge. Consequently the unshielded area, if any, that may be provided by the cover obstructing portion preferably will be located closer to the cover handle than to the grill hinge. In addition, the cover gasket preferably should remain fully or largely shielded by the cover obstructing portion, since a fire-damaged gasket may need to be replaced and doing so can be time-consuming.

The disclosed adapters may include a variety of alternative or additional features if desired. For example, in some grills (such as the above-mentioned Kamado Joe grills), the cover has a latch that normally engages a complementary latching portion on the base when the cover is closed, and the adapter cover attaching portion may include a similar complementary latching portion that can be engaged by the cover latch when the adapter is installed in the grill. Magnets, clamps, auxiliary latches, screws or other fastening devices may also or instead be used to attach the cover attaching portion to a grill cover and to permit removal of the adapter after the fire has died down or when extinguishment of the remaining embers is desired. Preferably such attachments are easily done and undone to permit temporary attachment and easy, quick removal of the disclosed adapter to and from a grill. The disclosed adapters may be made from a variety of materials including rolled or cast metals, ceramics, and composites. Exemplary metals include cold-rolled steel, hot-rolled steel, weathered steel (e.g. steel in an ASTM A588, A606-4, A847 or "Cor-Ten" finish), stainless steel, aluminum and laminates thereof. Exemplary ceramics include alumina, boron nitride, cordierite, mullite, silicon carbide, spinel, steatite, titanium carbide, Wollastonite, zirconia (including partially stabilized zirconia), glass-ceramics, porcelain, earthenware, reinforced ceramic composites and mixtures or combinations thereof. Foamed and other insulating ceramics may also be employed. Exemplary ceramic material suppliers or ceramic part manufacturers include Accuratus Corp., Applied Ceramics, Inc., Associated Ceramics and Technology, Inc., Bailey Ceramic Supply, BASF, Continental Clay, CoorsTek, Inc., McDaniel Advanced Ceramic Technologies, National Ceramic Co., Saint-Gobain Advanced Ceramics, Wunder Mold and other suppliers or manufacturers that will be familiar to persons having ordinary skill in the ceramic cooker art. The adapters may be unfinished or finished and may for example have an oxidized, anodized, painted, chromed, powder-coated, ceramic or glazed finish applied before or after the adapter has been fabricated.

As further examples, the cover obstructing portion in the disclosed adapters may include one or more hinged portions to permit the adapter to be folded inwardly or outwardly upon itself, for example to permit more compact storage. The disclosed adapters may include a backside handle or hook (e.g., a handle or hook fastened to the cover obstructing portion and residing inside the cover when the adapter is installed) to facilitate carrying or storing the adapter. The disclosed adapters may include a cover attachment portion with an adjustable anchoring position, or may include a plurality of cover attaching portions positioned at two, three or more increasing distances from the cover attaching portion, so as allow a single adapter to be installed on the covers of grills having a range of sizes. The disclosed adapters may include a blower motor and fan located on the adapter fire side or backside, and for a backside fan may include one or more apertures located below and at or above the fan to facilitate the delivery of warmed air to the outdoor area in front of a grill. The disclosed adapters may include specularly reflective or diffusive surface treatment, coloration, dimpling or other surface modification of the backside, fire side or both backside and fire side. The disclosed adapters may include an insulation layer (for example a backside insulation layer of any desired construction), or a multifunctional layer (for example a fire side layer having both an insulation layer and an outer reflecting layer). The disclosed adapters may include one or more reinforcing bars, flanges, corrugations or other stiffening members or shapes that strengthen the adapter overall as well as improving its structural integrity if subjected to sudden temperature changes, accidental droppage or other stresses or impacts. The disclosed adapters may also include labels, warning legends, instructions or other printed information on the fire side, backside or other available adapter surfaces.

The dimensions and overall shape of the disclosed adapters may be altered as need be to accommodate various grill models and sizes. For example, Kamado Joe grills are currently available with a circular cross-sectional shape at the joinder seam and nominal firebox widths of 34 cm (13.5 inches) for the Junior Series, 46 cm (18 inches) for the Classic Series and 61 cm (24 inches) for the Big Joe and Pro Joe Series grills. Big Green Egg grills are currently available with a circular cross-sectional shape at the joinder seam and nominal wire cooking grid diameters of 24 cm (9.5 inches) for the Mini grill, 33 cm (13 inches) for the Small grill, 38 cm (15 inches) for the Medium grill, 46 cm (18.25 inches) for the Large grill, 61 cm (24 inches) for the XL grill and 74 cm (29 inches) for the 2XL grill. The typical grill wall thickness at the mating sealing surfaces for these grills is about 25 cm (1 inch) in the case of a Kamado Joe Classic Series or Big Green Egg Large grill, and with similar, lesser or greater grill wall thicknesses for other size grills. Exemplary other grills that can be used with the disclosed adapter device include those shown in U.S. Pat. No. 3,276,440 (Sazegar) and U.S. Pat. No. 3,809,058 (Becker), in U.S. Published Patent Application Nos. US 2009/0308373 A1 (Scott et al.), US 2010/0095946A1 (Creel), US 2010/0258105 A1 (Simms, II) and US 2010/0258106 A1 (Simms, II), and hinged covered grills from other suppliers including Bayou Classic, Big Steel Keg, Blaze, California Kamado, Char-Broil, Char-Griller, GourmetPot, Grill Dome, Imperial Kamado, Kamado Joe, Komodo Kamado, Meteor, Monolith Grill GmbH, Primo Grills and Smokers, Saffire and Weber-Stephen Products.

The overall adapter shape need not be generally circular and may instead be oval, teardrop-shaped or otherwise shaped as needed to hold open and adequately shield the cover of the intended grill or grills, and to provide reflected heat over a suitable area in front of such grill(s). The chosen individual adapter dimensions, angles and overall shapes may consequently be designed to accommodate grills having a range of sizes and cross-sectional shapes at the joinder seam, or may be sized and shaped to accommodate a specific grill model, grill shape and grill size. The disclosed adapters may also be designed to provide lesser or greater extents of partial cover opening during adapter installation and use. As a general guide for use on the covers of circular hinged, covered grills, the cover obstructing portion outside diameter (excluding any projecting cover attachment portion, cover supporting portion, wings or handles) may for example be about 28 cm (11 inches) to about 81 cm (31 inches). The adapter desirably covers the cover gasket so as to shield it from combustion heat, and may if desired project beyond the outside diameter of the gasket to provide additional shielding or to permit use on grills having a range of cover sizes as discussed above. Such projection may for example be at least about 1 mm (0.04 inches), at least about 3 mm (0.12 inches), at least about 5 mm (0.2 inches) or at least about 10 mm (0.4 inches), and up to about 20 mm (0.8 inches), up to about 50 mm (2 inches), up to about 100 mm (4 inches), up to about 200 mm (8 inches), up to about 300 mm (12 inches), or up to about 400 mm (16 inches), as measured on average around the cover obstructing portion perimeter or as measured proximate the cover handle. Indentations, clearance recess or other accommodations may be provided as needed to permit hinge clearance and operation. The thickness of the disclosed adapter will depend on part on the chosen material and may for example be about 1 mm (0.04 inches) to about 2.5 cm (1 inch). The extent to which the grill cover is partially opened during use of the adapter may for example be at least about 20, at least about 30 or at least about 40 degrees, and up to about 45, up to about 50, up to about 55 up to about 60 degrees of upward cover rotation with respect to the joinder seam. The same angle ranges may be used to describe the angles defined by the respective cover-contacting and base-contacting surfaces in the adapter's cover supporting portion.

Having thus described preferred embodiments of the present invention, those of skill in the art will readily appreciate that the teachings found herein may be applied to yet other embodiments within the scope of the claims hereto attached. The complete disclosure of all patents, patent documents, and publications are incorporated herein by reference as if individually incorporated.

The invention claimed is:

1. A removable outdoor warming adapter device, the adapter device being sized and shaped to temporarily and detachably hold in a partially opened position a hinged covered charcoal- or wood pellet-fired kamado-style grill, the grill having i) a grill base, ii) a grill cover, the grill base and grill cover being joined by iii) a hinge, iv) a grill cover handle opposite the hinge; v) vi) a grill front opposite the hinge, vii) a wire cooking grid, and viii) a grill cover gasket defining a gasketed grill cover periphery and a grill cover opening area, wherein the adapter device includes both:

a) a grill cover supporting portion that holds the grill cover and grill base apart in a partially opened position when the adapter device is inserted between the grill cover and grill base, and becomes pinched between the grill cover gasket and the grill base when the grill cover is rotated towards the grill base, and b) a combustion heat-resistant rigid metal grill cover obstructing portion that shields the majority of the grill cover gasket and grill cover opening area from combustion heat rising from a heat source in the grill base, the grill cover obstructing portion comprising a rigid metal sheet having a thickness of about 1 mm (0.04 inches) to about 2.5 cm (1 inch) and being fastened to or including the grill cover supporting portion, and wherein when the adapter device is so inserted to hold the grill cover and base in such partially opened position and pinch the grill cover supporting portion of the adapter between the grill cover gasket and the grill base, the grill cover obstructing portion of the adapter is inclined to reflect the rising combustion heat in a generally horizontal direction away from the hinge and towards the grill front.

2. An adapter device according to claim 1 wherein the adapter device further includes a grill cover attaching portion that temporarily and detachably fastens the adapter device to the grill cover handle.

3. An adapter device according to claim 1 wherein the grill cover obstructing portion has a planar fire side major surface and a continuous or nearly continuous circular periphery.

4. An adapter device according to claim 1 wherein the grill cover obstructing portion has a fire side major surface that is curved in at least one direction.

5. An adapter device according to claim 1 wherein the grill cover obstructing portion has a fire side major surface that is curved in two directions.

6. An adapter device according to claim 1 wherein the grill cover obstructing portion curves outwards from grill covers on which the adapter device is installed and presents convexity with respect to the rising combustion heat to reflect the rising combustion heat across a broadened angular range and over a larger frontal area.

7. An adapter device according to claim 1 wherein the grill cover obstructing portion shields all of the grill cover gasket from the combustion heat.

8. An adapter device according to claim 1 wherein the grill cover obstructing portion shields all of the grill cover opening area from the combustion heat.

9. An adapter device according to claim 1 wherein the grill cover obstructing portion includes specularly reflective or diffusive surface treatment, coloration, dimpling or other surface modification.

10. An adapter device according to claim 1 wherein the grill cover obstructing portion includes an insulation layer, reflective layer or both on the grill cover obstructing portion backside or fire side.

11. An adapter device according to claim 1 wherein the grill cover obstructing portion has a larger diameter than the grill cover and projects outside the grill cover gasket.

12. An adapter device according to claim 1 wherein the grill cover obstructing portion has a diameter of about 28 cm (11 inches) to about 81 cm (31 inches).

13. An adapter device according to claim 1 wherein the grill cover obstructing portion includes one or more apertures that permit smoke from the heat source to exit the grill through the grill cover.

14. An adapter device according to claim 1 wherein the grill cover obstructing portion and the grill cover supporting portion are cut and folded from a flat metal sheet.

15. An adapter device according to claim 1 wherein the grill cover obstructing portion includes one or more hinged portions that permit the adapter device to be folded upon itself for more compact storage.

16. An adapter device according to claim 1 wherein the grill cover obstructing portion includes a backside handle or hook to facilitate carrying or storing the adapter device.

17. An adapter device according to claim 1 wherein the adapter device includes a blower motor and fan to facilitate the delivery of warmed air to an outdoor area in front of the grill.

18. An adapter device according to claim 1 wherein the adapter device includes one or more reinforcing bars, flanges, corrugations or other stiffening members or shapes that strengthen the adapter device and improve its structural integrity if subjected to sudden temperature changes, accidental droppage or other stresses or impacts.

19. An adapter device according to claim 1 wherein the grill cover supporting portion has a wedge-shaped side profile.

20. An adapter device according to claim 1 wherein the grill cover supporting portion is triangular in cross-section.

21. An adapter device according to claim 1 wherein the grill cover supporting portion has grill cover-contacting and grill base-contacting surfaces that hold the grill cover and grill base apart in the partially opened position at an angle of about 20 to about 60 degrees.

22. An adapter device according to claim 1 wherein the grill cover supporting portion has grill cover-contacting and grill base-contacting surfaces that hold the grill cover and grill base apart in the partially opened position at an angle of about 30 to about 50 degrees.

23. An adapter device according to claim 1 wherein the adapter device comprises folded sheet steel.

24. An adapter device according to claim 1 wherein the adapter device comprises aluminum.

25. An adapter device according to claim 1 wherein the grill is a generally egg-shaped kamado grill having a ceramic base and ceramic cover.

26. An adapter device according to claim 1 wherein the grill has a metal insulated base and metal insulated cover.

27. A hinged, covered kamado-style grill having a grill base and a grill cover joined by a hinge, a grill cover handle and a grill front opposite the hinge, a wire cooking grid, and a grill cover gasket defining a gasketed grill cover periphery and a grill cover opening area, and further comprising a removable outdoor warming adapter device temporarily and detachably inserted between the grill cover and grill base, wherein the adapter device includes both:

a) a grill cover supporting portion that holds the grill cover and grill base apart in a partially opened position when the adapter device is so inserted, and becomes pinched between the grill cover gasket and the grill base when the grill cover is rotated towards the grill base, and b) a combustion heat-resistant rigid metal grill cover obstructing portion that shields the majority of the grill cover gasket and grill cover opening area from combustion heat rising from a charcoal or wood pellet heat source in the grill base, the grill cover obstructing portion comprising a rigid metal sheet having a thickness of about 1 mm (0.04 inches) to about 2.5 cm (1 inch) and being fastened to or including the grill cover supporting portion, wherein when the adapter device is so inserted and the grill cover and base are in such partially opened position and pinch the grill cover supporting portion of the adapter between the grill cover gasket and the grill base, the grill cover obstructing portion of the adapter is inclined to reflect such rising combustion heat in a generally horizontal direction away from the hinge and towards the grill front.

28. A method for outdoor warming, comprising in either order the steps of a) building a fire from combustible charcoal or wood pellet material in a base of a hinged, covered kamado-style grill having a grill base and a grill cover joined by a hinge, a grill cover handle and a grill front opposite the hinge, a wire cooking grid, and a grill cover gasket defining a gasketed grill cover periphery and a grill cover opening area, and b) opening the grill cover, temporarily and detachably installing in the grill a removable outdoor warming adapter device that is sized and shaped to hold the grill cover in a partially opened position and to become pinched between the grill cover gasket and the grill base when the grill cover is rotated towards the grill base, and partially closing the grill cover to trap and pinch the adapter device between the grill cover and grill base with the grill cover in such partially opened position, wherein the adapter device includes both:

i) a grill cover supporting portion that holds the grill cover and grill base apart in such partially opened position when the adapter device is inserted between the grill cover and grill base and the grill cover is rotated towards the grill base, and ii) a combustion heat-resistant rigid metal grill cover obstructing portion that comprises a rigid metal sheet having a thickness of about 1 mm (0.04 inches) to about 2.5 cm (1 inch), is fastened to or includes the grill cover supporting portion, shields the majority of the grill cover gasket and grill cover opening area from combustion heat rising from the fire, and is inclined to reflect such rising combustion heat in a generally horizontal direction away from the hinge and towards the grill front.

* * * * *